Patented Feb. 8, 1938

2,107,611

UNITED STATES PATENT OFFICE 2,107,611

CATALYSTS AND METHOD OF PREPARING THE SAME

Carl H. B. Jarl, Royal Oak, and Almon G. Hovey, Pleasant Ridge, Mich., assignors to Beck, Koller & Company, Inc., Detroit, Mich.

No Drawing. Application May 29, 1937, Serial No. 145,633

8 Claims. (Cl. 23—233)

This invention relates to improvements in the preparation of catalysts and particularly such catalysts as are used in the vapor phase catalytic reactions.

Heretofore much difficulty has arisen in attempting to secure the catalytically active materials to the proper place in the apparatus. A coated catalyst is the most common form, the coating at present being applied by various methods. One method is by evaporating a solution, suspension or colloidal solution of the catalytically active material and depending upon evaporation of water or some other solvent to deposit the catalytic material on the porous material. After evaporation the irregularity of surface of the carrier is depended upon to hold the catalytically reactive materials in place. Another method consists of spraying a solution, suspension or colloidal solution of the catalytically reactive material onto the carrier, which is generally kept in motion so as to insure uniform distribution of material on the surface. Neither of these methods produces a catalyst that can stand very much mechanical handling and the loss of catalytically reactive material by dusting or flaking off is considerable. Even if this material is recovered there is a great loss in efficiency during the process due to partially exposing the carrier.

We have tried to overcome the lack of adhesion by the use of binders. While inorganic binders such as silicic acid, phosphoric acid, silicate of soda or potash and the like are capable of giving permanent adhesion, nevertheless, in most cases the use of these binders is very objectionable because they tend to start undesired side reactions and also tend to form a permanent coating over the catalytically reactive particles, and thus their value is impaired since they are insulated from contact with the substance in the gaseous phase which is to be catalyzed.

In the case of most of the organic binders we have found that upon attempting to remove them by burning them off, a very undesirable tendency toward carbonization takes place. The presence of the finely divided carbonaceous particles gives in effect a reduced catalyst which entirely defeats the purpose for which the process is intended. In the case of vanadium pentoxide catalyst, which changes to vanadium dioxide and back and forth in the oxidation of organic materials, its efficiency is greatly impaired if it is reduced down to lower oxide stages, for instance the sesqui-oxide.

The present invention entirely overcomes these objections by using binders which are either completely volatile without decomposition at or below the operating temperature, or which are depolymerized to form products which are easily volatile without carbonization. As an example of a binder of the first type we can mention in general pure alkyd resins which consist of polyhydric-alcohol-polybasic-acid condensation products without further modification. An example of the second type is polystyrol resin which is made by polymerization of styrol. This depolymerizes, upon heating, to a volatile liquid without carbonization. The invention is not limited to these two examples but is intended to include all types of resinous binders which volatilize completely without carbonization.

Example I

| | Parts |
|---|---|
| Ammonium meta vanadate | 245 |
| Silver nitrate | 3.5 |
| Alkyd resin | 50 |

The alkyd resin may be made by condensing in known manner, 200 parts by weight of phthalic anhydride and 100 parts by weight of glycerine, by heating to 200° C. until the product has a melting point of 115° C.

These materials are ground together in a ball mill first dry, and are then ground again wet after addition of 600 parts by weight of acetone. The resulting suspension is sprayed onto 3850 parts of quartz chips, which had previously been etched in caustic soda and washed with hydrochloric acid.

The resulting catalyst is air-dried to remove acetone and is then placed in the catalytic converter which is slowly heated to about 400° C., while a stream of air is led through it. The stream of air is employed to sweep off the vapors generated. When the catalyst is treated in this manner the alkyd resin vaporizes off completely leaving no carbonaceous residue. The catalyst may be used with excellent results for conversion of naphthalene to phthalic anhydride.

Example II 240 parts of ammonium vanadate are heated under agitation to about 375° C. The vanadium pentoxide thus obtained is finely divided and can be directly mixed with a vehicle consisting of 20% acetone solution of a resin made by condensation of 1 mol. of ethylene glycol and 1 mol. of phthalic anhydride.

The catalyst is sprayed and treated as in the previous example and may be used for dehydrogenation of methyl alcohol to formaldehyde, oxidation of naphthalene to phthalic anhydride and similar processes.

Example III

A vehicle consisting of 15 parts of polystyrene and 100 parts of toluene is mixed with 100 parts of vanadium pentoxide made by decomposition by heat of ammonium meta vanadate. Proper consistency for spraying is maintained by addition of toluene and the mixture is sprayed onto 2000 parts of quartz.

This catalyst may be used for many purposes particularly for conversion of methanol to formaldehyde, and naphthalene to phthalic anhydride.

Example IV

A mixed catalyst for reduction of carbon monoxide with hydrogen to form formaldehyde is prepared in the following manner:—120 parts of manganese carbonate, 140 parts of ammonium meta vanadate, 40 parts of silver nitrate, 30 parts of cadmium nitrate and one part of platinum chloride are ground together in a ball mill. A vehicle consisting of a 15% solution of polystyrene in toluene is added and the mixture is ground until smooth, diluted with toluene to the proper consistency and the mixture is sprayed onto 1500 parts of pumice of an average particle size of 5–7 millimeters. After evaporation of the toluene the catalyst is placed in a copper tube and heated to 250–300° C. while a slow stream of hydrogen gas is led through the tube.

Example V 35 parts of zinc oxide are ground up in a 100 parts of a vehicle consisting of a 15% toluene solution of polystyrene. This mixture is sprayed onto quartz of about 5–7 millimeters average diameter. After evaporation of the solvent the catalyst is placed in a tube and heated to about 400° C. The catalyst prepared in this manner is used advantageously to decarboxylate phthalic anhydride to form benzoic acid and carbon dioxide.

We claim:—

1. In a process for the preparation of catalysts by coating a carrier with catalytically active material and a binder, and then volatilizing the binder; the improvement wherein the binder employed is selected from a group consisting of unmodified polyhydric alcohol-polybasic acid condensation products and resins formed by the polymerization of styrol.

2. The process as set forth in claim 1, wherein the binder is an unmodified polyhydric alcohol-polybasic acid condensation product.

3. The process as set forth in claim 1, wherein the binder is a reaction product of phthalic anhydride and glycerine.

4. The process as set forth in claim 1, wherein the binder is a reaction product of phthalic anhydride and ethylene glycol.

5. A process for the preparation of catalysts which comprises coating a carrier with catalytically active material and a polystyrol resin, and then volatilizing the resin.

6. A catalyst carrier coated with a composition containing a finely divided catalytically active substance and a temporary binder selected from a group consisting of unmodified polyhydric alcohol-polybasic carboxylic acid condensation products and styrol resins.

7. A catalyst carrier coated with a composition containing a finely divided catalytically active substance and a temporary binder comprising an unmodified polyhydric alcohol-polybasic carboxylic acid condensation product.

8. A catalyst carrier coated with a composition containing a finely divided catalytically active substance and a temporary binder comprising a styrol resin.

CARL H. R. JARL.
ALMON G. HOVEY.